United States Patent [19]
Hanagan

[11] 3,927,727
[45] Dec. 23, 1975

[54] VEHICULAR SEAT AND FAIRING ASSEMBLY

[75] Inventor: Michael W. Hanagan, Somers, Conn.

[73] Assignee: Corbin Gentry Inc., Somersville, Conn.

[22] Filed: Apr. 17, 1974

[21] Appl. No.: 461,604

[52] U.S. Cl. .................. 180/30; 49/402; 220/335; 229/44 M; 292/163; 280/289; 297/193; 297/195; D12/119
[51] Int. Cl.² .................. B62D 61/02; B60R 11/06
[58] Field of Search ......... 180/30, 32, 33 A, 34, 35; 280/289; 229/44 M; D12/110, 109, 119; 292/163; 220/335; 49/402; 297/193, 195

[56] References Cited
UNITED STATES PATENTS

| | | | |
|---|---|---|---|
| 766,198 | 8/1904 | Reilly | 292/163 |
| 2,237,677 | 4/1941 | Lewis | D12/110 X |
| 2,319,600 | 5/1943 | Heath | 49/402 X |
| 3,140,344 | 7/1964 | Slater et al. | 220/335 X |
| 3,372,768 | 3/1968 | Wresch | 180/34 |
| 3,513,926 | 5/1970 | Paget | 180/32 |
| 3,650,344 | 3/1972 | Plessinger | 180/35 X |
| 3,779,597 | 12/1973 | Uchida | 297/195 X |
| 3,782,592 | 1/1974 | Bergh et al. | 229/44 M X |
| D165,690 | 1/1952 | Kistler | D12/110 |
| D212,404 | 10/1968 | Bauer | D12/110 |

FOREIGN PATENTS OR APPLICATIONS

| | | | |
|---|---|---|---|
| 516,776 | 2/1955 | Italy | 180/35 |
| 708,586 | 5/1954 | United Kingdom | 180/35 |
| 1,051,048 | 1/1954 | France | 180/35 |

OTHER PUBLICATIONS
BMW Brochure.

Primary Examiner—Leo Friaglia
Assistant Examiner—John P. Silverstrim

[57] ABSTRACT

A vehicular seat and fairing assembly is provided which is particularly suited for embodiment in a two-wheeled vehicle such as a motorcycle. The subject assembly includes a fairing and a seat supported thereon. The fairing is preferably made of a suitable weather resistant material so as to be capable of withstanding exposure to the elements to which motor vehicles are commonly subjected. Moreover, the fairing has a substantially U-shaped configuration which is defined by a pair of depending side walls, a rear wall and a top wall. The seat which functions as a support for the driver of the vehicle while operating the latter as well as as a support for any passenger riding on the vehicle may be of any suitable construction. The seat is suitably mounted on the outside surface of the top wall of the fairing. Seats of differing sizes and configurations are capable of being accommodated on the fairing. The fairing with the seat mounted thereon is pivotably supported on the frame of the vehicle for movement between a locked lowered position and an unlocked raised position relative to the frame of the vehicle. The assembly is locked in its lowered position by means of a latching means suitably located for this purpose on the frame of the vehicle. Accessories comprising a pair of directional signal lights, a taillight and a license plate are suitably mounted on the seat and fairing assembly. The pair of directional signal lights are supported on the exterior surface of the pair of side walls of the fairing while the taillight and license plate are mounted on the outer surface of the rear wall of the fairing.

3 Claims, 7 Drawing Figures

U.S. Patent  Dec. 23, 1975  Sheet 2 of 2  3,927,727
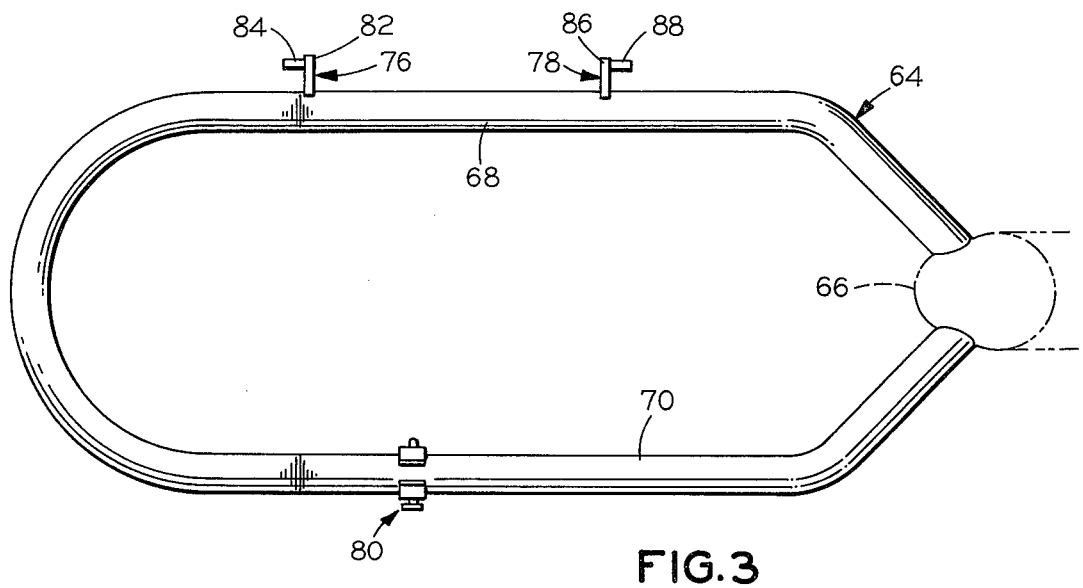
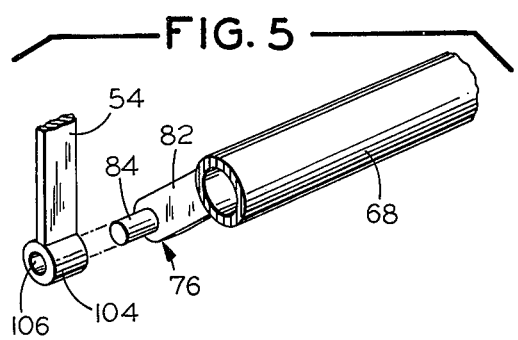
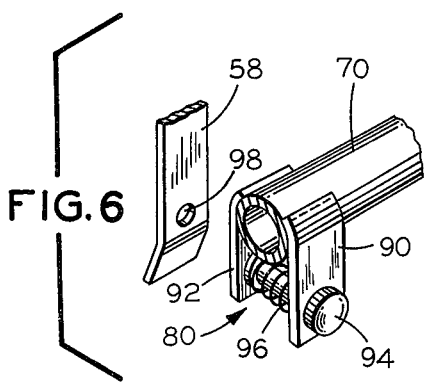
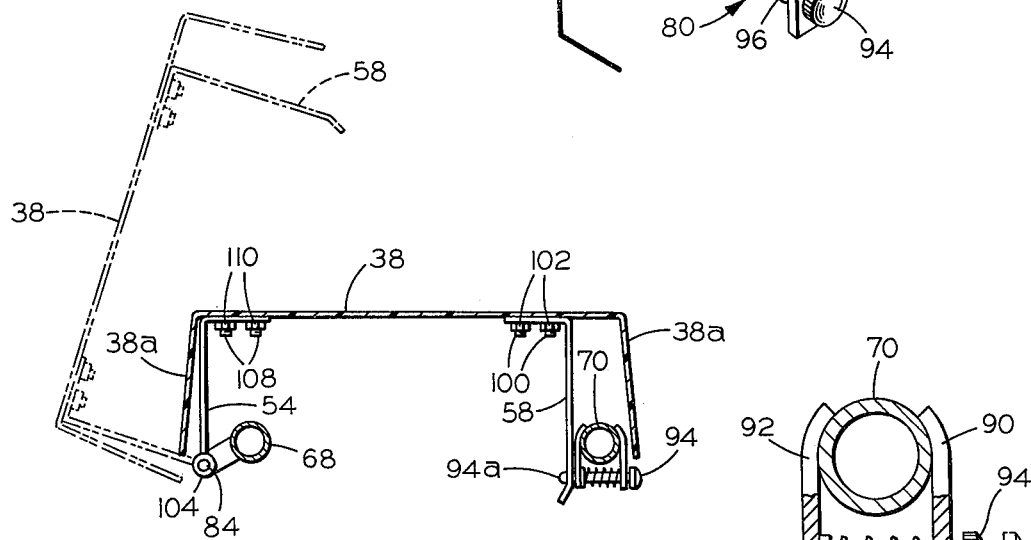
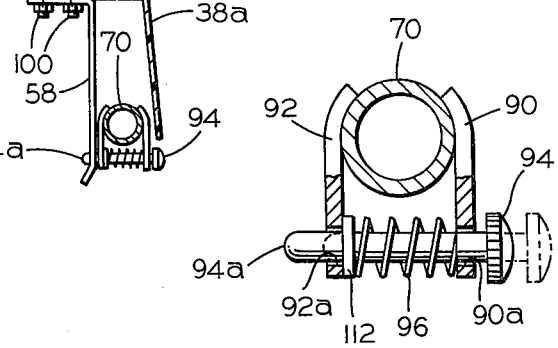

VEHICULAR SEAT AND FAIRING ASSEMBLY

BACKGROUND OF THE INVENTION

In recent years, there has developed a noticeable upward trend in the number of people who are devoting a signicant amount of time to recreational pursuits of one type or another. One of these recreational pursuits is that of motorcycling. The extent of interest which exists in motorcycling is clearly shown by the rapidly increasing number of registrations of this type of motor vehicle. There are a variety of ways in which motorcycles are being used. Namely, some people employ motorcycles merely as a recreational vehicle. Others are interested in participating in the various racing events for motorcycles which are held in large numbers particularly during the summer months in different portions of the country. In addition, many organizations which are involved in public safety such as police departments, etc. have purchased motorcycles for their own use as a means of assisting them to meet their assigned responsibilities. Finally, in recent months as the gasoline shortage has become more pronounced throughout this country, many people have turned to motorcycles as an alternate mode of transportation to get to and from work, etc. because of the fact that motorcycles are noted for their economical fuel performance.

Concomitant with the rise in interest paid to motorcycles, there has been some attention given to making changes in the nature of the construction of the motorcycles. This has led to a proliferation of different types of motorcycles as well as the many different models of each type which are presently being marketed. As a result, the potential purchaser of a motorcycle has practically an unlimited selection to choose from. In addition to the so-called original equipment manufacturers who manufacture and sell motorcycles as complete units there also exists a number of other manufacturers who specialize in the manufacture of only different ones of the major components which are embodied in a motorcycle. The latter manufacturers offer their products to potential purchasers as components which can be substituted in the motorcycle for original equipment components provided therein. As a result of the availability of the latter type of products, a motorcycle owner by purchasing such equipment and embodying it in his motorcycle is capable often of changing almost completely the entire character of his motorcycle.

Notwithstanding the fact that some changes have been made in the construction of motorcycles heretodate, by and large these changes have been in the nature of matters of appearance rather than in matters of structure. More specifically, apart from notable advances which have been made in recent years in the construction of motorcycle seats, little has changed in the basic design of motorcycles from a structural standpoint.

In order for the motorcycle to provide optimum performance obviously there are certain functional requirements which each of the major components that are embodied in the motorcycle must meet. For example, insofar as concerns motorcycle seat design, one of the aforereferenced features which must be considered is the nature of the materials from which the seat is constructed. Namely, the seat must be made from materials which are capable of withstanding the weather conditions which it can be expected that the motorcycle will encounter. In addition, the seat must have a construction which both from the standpoint of the materials employed therein as well as the particular configuration thereof will be operative to minimize the possibility of a driver and/or his passenger slipping off the seat while the motorcycle is being operated. Moreover, the seat must be constructed so as to be mountable to the frame of the motorcycle whereby the former will not readily become detached from the latter when the motorcycle is being operated. Also, since the seat constitutes the member on which the driver supports himself while operating the motorcycle, it is desirable that the seat be comfortable so as to enable the driver to run the motorcycle for extended periods of time without growing excessively weary as a result thereof. More specifically, the seat should be capable of functioning in association with the suspension means of the motorcycle to absorb the shocks to which the motorcycle is subjected as it moves over a surface minimizing, if not completely eliminating, the shocks which are felt by the motorcycle driver. Another feature which it is desirable that a seat possess is that it be compatible for use in different types of motorcycles. Thus, although the overall dimensions of the seat may vary for different models of motorcycles, it is nevertheless advantageous to be capable of providing a seat which has a construction that is readily adapted to be employed in a plurality of different types of motorcycles without necessitating substantial modification thereof.

In accord with the manner in which the seat is conventionally mounted in a motorcycle, the seat extends over at least a portion of the rear fender of the motorcycle. In addition, at least a portion of the seat functions as a cover for the battery and some of the other electrical components which are necessarily embodied in the motorcycle as a requirement for the operation thereof. Heretofore, it has been necessary in order to obtain access to the battery and other electrical components for purposes of performing normal maintenance and repair thereof to first remove the seat from the motorcycle. Although the task of removing the seat from a prior art form of motorcycle is not unduly difficult, it nevertheless is time-consuming to have to take the seat off and then later replace it. Moreover, it requires the use of tools which are not always readily at hand. Furthermore, since in most instances the seat is secured to the motorcycle through the use of some type of conventional fastening means which must be removed in order to detach the seat from the frame of the motorcycle, there always exists the possibility that when the fastening means are removed they may become misplaced and/or lost.

Although a number of different forms of seats have been provided heretodate in the prior art for use in motorcycles, none of these prior art forms of seats has embodied a construction which would obviate the aforedescribed undesirable feature discussed in the preceding paragraph regarding the need for seat removal. Consequently, a need has existed to provide a seat assembly which would possess all of the desirable features referred to previously hereinabove but would also facilitate obtaining access to the equipment housed below the seat. Moreover, a need has existed to improve the design appearance of the motorcycle particularly with regard to the rear fender portion thereof while simultaneously reducing the amount of drag produced thereby. In addition, a need has existed to improve the manner in which the taillight and license plate assembly are situated at the rear of the motorcycle.

Accordingly, it is an object of the present invention to provide a novel and improved vehicular seat and fairing assembly which is particularly suited to be embodied in a two-wheeled vehicle such as a motorcycle.

It is also an object of the present invention to provide such a vehicular seat and fairing assembly wherein the seat included therein is constructed so as to meet all of the functional requirements which it is desirable be possessed by a seat designed to be embodied in a motorcycle such as being weather resistant, providing comfortable seating support for the driver, being compatible for use in different types of motorcycles, etc.

It is another object of the present invention to provide such a vehicular seat and fairing assembly which is pivotably mounted to the frame of the motorcycle so as to be movable between a lowered position wherein the assembly cooperates to form an enclosure for the battery and some of the other electrical equipment of the motorcycle and a raised position whereby access may readily be had to the battery and the aforementioned equipment for purposes of performing normal maintenance and repair thereon.

Another object of the present invention is to provide such a vehicular seat and fairing assembly which when embodied in a motorcycle functions to provide the rear portion of the motorcycle with an attractive appearance and which also is operable to reduce the amount of drag produced by the rear portion of the motorcycle.

Yet another object of the present invention is to provide such a vehicular seat and fairing assembly which serves as a mounting for the taillight and license plate assembly of the motorcycle.

Yet still another object of the present invention is to provide such a vehicular seat and fairing assembly which is relatively inexpensive to manufacture, is easily assembled on a motorcycle without requiring substantial modification thereof, and which is capable of being employed on different types of motorcycles.

SUMMARY OF THE INVENTION

It has now been found that the foregoing and related objects can be readily attained in a vehicular seat and fairing assembly which is particularly suited for embodiment in a two-wheeled vehicle such as a motorcycle. The fairing has a substantially U-shaped configuration which is defined by a pair of depending side walls, a rear wall and a top wall. The seat which functions as a support for the driver of the vehicle while operating the latter may be of any suitable construction. The seat is suitably mounted on the outside surface of the top wall of the fairing. The fairing with the seat mounted thereon is pivotably mounted on the frame of the vehicle for movement between a locked lowered position and an unlocked raised position relative to the frame of the vehicle. The assembly is locked in its lowered position by means of a latching means suitably located for this purpose on the frame of the vehicle. Accessories comprising a pair of directional signaling lights, a taillight and a license plate are suitably mounted on the seat and fairing assembly. The pair of directional signaling lights are supported on the exterior surface of the pair of side walls of the fairing while the taillight and license plate are mounted on the outer surface of the rear wall of the fairing.

In accordance with the preferred embodiment of the invention, the fairing is made of a suitable weather resistant material such as a composition of fiberglass which is capable of withstanding exposure to the elements to which motor vehicles are commonly subjected. The fairing is suitably dimensioned so as to be capable of accommodating seats of different sizes and configurations thereon. The seat itself includes an exterior skin portion which envelopes a suitably contoured interior portion. More particularly, the exterior skin portion is preferably formed of naugehyde while the interior portion consists of a one-piece high density foam molded member. For purposes of receiving the seat, i.e., saddle, thereon the top wall of the fairing is preferably provided with a well configured so as to conform to the circumference of the seat. The seat may be secured in the foresaid well through the use of any suitable fastening means such as a plurality of threaded studs suitably attached to the under surface of the seat so as to depend therefrom. The latter studs in turn are received in suitable openings formed for this purpose in the top wall of the fairing with nuts being threadedly engaged thereon. The seat and fairing assembly is preferably mounted to the frame of the motorcycle through the use of a pair of hinge members which are secured in suitably spaced relation along one portion of the motorcycle frame. The hinge members each terminate in a pivot pin which is cooperatively engaged in an opening provided therefor at the end of a member which is secured on one of the inside surfaces of the fairing so as to depend therefrom. Opposite the aforementioned pair of hinge members, there is provided a latching means on the motorcycle frame. The latching means includes a spring biased pin one end of which is designed to be received in a suitably dimensioned opening provided in a member which depends also from one of the inside surfaces of the fairing whereby when the pin is positioned in the opening, the seat and fairing assembly is locked to the frame.

BRIEF DESCRIPTION OF THE DRAWINGS

FIG. 3 is a top plan view of the portion of the frame of the motorcycle on which a vehicular seat and fairing assembly constructed in accordance with the present invention is pivotably mounted;

FIG. 4 is a cross sectional view of a vehicular seat and fairing assembly constructed in accordance with the present invention mounted on a portion of the frame of the motorcycle with the assembly being illustrated in solid lines in its locked lowered position relative to the motorcycle frame and in broken lines in its unlocked raised position relative to the motorcycle frame;

FIG. 5 is an exploded perspective view of one of the hinge means assemblies by means of which a vehicular seat and fairing assembly constructed in accordance with the present invention is pivotably mounted on a motorcycle frame;

FIG. 6 is an exploded perspective view of the latching means by means of which a vehicular seat and fairing assembly constructed in accordance with the present invention is locked in a lowered position relative to the motorcycle frame; and FIG. 7 is a cross sectional view of the latch pin portion of the latching means which is employed for purposes of locking a vehicular seat and fairing assembly constructed in accordance with the present invention in its lowered position relative to the motorcycle frame.

DETAILED DESCRIPTION OF THE ILLUSTRATED EMBODIMENT

Figure 1:
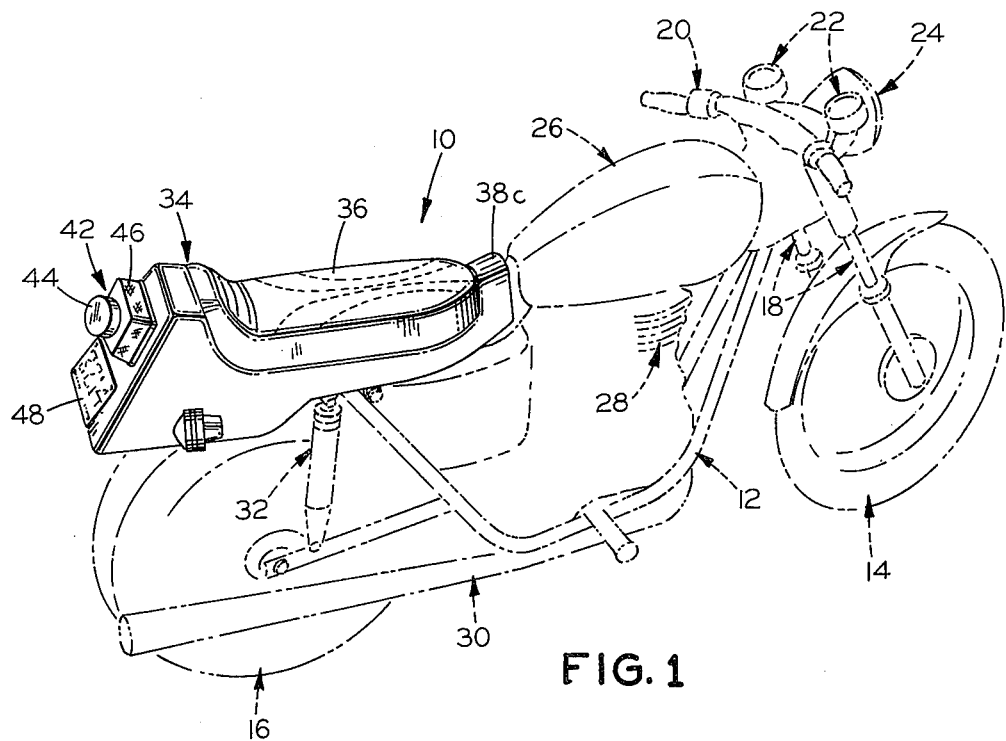
FIG. 1 is a perspective view of a motorcycle embodying a vehicular seat and fairing assembly constructed in accordance with the present invention, illustrating the assembly in the locked lowered position thereof and with the remainder of the motorcycle being depicted by means of broken lines.

Referring now to the drawings and more particularly FIG. 1 thereof, there is illustrated therein in broken lines a motorcycle, generally designated by reference numeral 10. The motorcycle 10 includes a frame 12, and a pair of wheels, i.e., a front wheel 14 and a rear wheel 16. The front wheel 14 in accord with conventional practice is interconnected by means of a steering column assembly 18 to a handlebar 20. As is well known, the handlebar 20 is employed to steer the motorcycle 10 by causing the front wheel 14 to be turned in the direction in which the driver of the motorcycle 10 desires to proceed. There are located adjacent to the handlebar 20, suitable instrument gauges 22 which are employed for purposes of indicating to the driver of the motorcycle 10 information pertaining to the operation of the latter. Also, mounted on the motorcycle 10 adjacent to but spaced from the handlebar 20 is a headlight 24 operable for illuminating the path of travel of the motorcycle 10 during periods of reduced visibility such as at night, etc. In addition, as depicted in FIG. 1 of the drawings, the motorcycle 10 further includes a fuel tank 26 which is operatively connected in a conventional manner to the engine 28 of the motorcycle 10 so as to be capable of providing fuel thereto. The fuel tank 26 and the engine 28 are suitably supported on the frame 12 of the motorcycle 10. An exhaust pipe 30 operatively connected at one end to the engine 28 extends substantially the length of the motorcycle 10 terminating at the rear end thereof so as to be operable to discharge the waste combustibles produced by the engine 28 during the course of the operation thereof. Also, the motorcycle 10 includes a suspension system 32 operatively connected to the rear wheel 16 at one end and to the frame 12 at the other end thereof so as to absorb the shocks encountered as the motorcycle 10 travels over a road surface.

Since the foregoing components of the motorcycle 10 which have been described hereinabove are only indirectly related to the subject matter of the present invention, further description thereof herein is believed to be unnecessary.

The motorcycle 10 illustrated in FIG. 1 of the drawings embodies a vehicular seat and fairing assembly, generally designated by reference numeral 34, constructed in accordance with the present invention. The assembly 34 is comprised of a seat 36 and a fairing 38. The seat 36 may be of differing size and/or configuration as long as the seat 36 remains capable of being accommodated on the fairing 38 in a manner yet to be described. More particularly, the seat 36 in accord with one form of construction thereof includes a metal base plate on which a one-piece high density foam molded member suitably contoured so as to conform to the shape of the base plate is provided. Interposed between the base plate and the foam molded member there is preferably provided for strengthening purposes a steel rod. An exterior skin portion made of a suitable weather resistant material such as naugehyde envelopes the foam molded member and at least the edge portions around the circumference of the base plate. Obviously, however, in accord with the present invention the seat 36 may embody many other different forms of construction without departing from the essence of the invention.

As best understood with reference to FIG. 3 of the drawings, the fairing 38 in accord with preferred embodiment of the invention has a substantially U-shaped configuration. More particularly, the fairing 38 is preferably of unitary construction and is formed of fiberglass which is operable to provide the fairing 38 with the requisite strength and durability. The U-shaped configuration of the fairing 38 is defined by a pair of depending side walls 38a, a rear wall 38b, and a top wall which terminates at the forward end thereof in a hump 38c, the latter being provided for a purpose yet to be described. Although not clearly visible in the drawings, the top wall of the fairing 38 preferably includes a well which is suitably dimensioned so as to permit the seat 36 to be received therewithin. The seat 36 may be secured in the aforementioned well through the use of any suitable conventional form of fastening means, the latter having been omitted in the drawings in the interest of maintaining clarity of illustration therein. One such form of fastening means by way of example, comprises a plurality of threaded studs (not shown) which are suitably attached at one end to the under surface of the seat 36, i.e., the base plate thereof so as to extend outwardly therefrom substantially at right angles thereto. The latter studs in turn are received in suitable openings formed for this purpose in the top wall of the fairing 38. After the studs are passed through the aforedescribed openings, suitable nuts (not shown) are threadedly engaged on the projecting portions thereof so as to securely hold the seat 36 fastened to the fairing 38.

In accord with the illustrated embodiment thereof, the motorcycle 10 is provided with a number of other components for which the vehicular seat and fairing assembly 34 functions as a support. Reference is had in this regard to a pair of directional signaling lights 40, only one of which is visible in the drawings. The signaling lights 40 operate in a manner well-known to motor vehicle drivers to provide a blinking light to denote the fact that the motorcycle driver intends to turn either right or left. The signaling light 40 which is visible in both FIGS. 1 and 2 of the drawings comprises the right signaling light, i.e., the one by means of which the motorcycle driver signals his intention to turn right. Each of the pair of signaling lights 40 is mounted on a corresponding one of the pair of side walls 38a of fairing 38 through the use of any conventional form of attaching means. The fairing 38 also functions as a support for a taillight assembly 42 which is composed of a taillight 44 and a support 46 therefor. The taillight assembly 42 is mounted on the flat planar surface provided by the rear wall 38b of the fairing 38. The taillight assembly 42 may be secured in position thereon through the use of a plurality of threaded fasteners, etc., or any other form of fastening means commonly employed to securely mount one member in position on another. The means employed to secure the taillight assembly 42 on the rear wall 38b has not been depicted in the drawings inasmuch as the former is well-known to those skilled in the art and also in the interest of maintaining clarity of illustration in the drawings. Finally, the license plate 48 of the motorcycle 10 is also preferably mounted on the rear wall 38b of the fairing 38 in spaced relation to the aforedescribed taillight assembly 42. The license plate 48 is preferably retained on the rear 38b through the use of the conventional form of license bolts and nuts (not shown) which it has long been known to employ for this purpose. It will obviously be understood that suitable openings are provided in the rear wall 38b of the fairing 38 to permit portions of the bolts to be passed therethrough.

Referring now again to FIG. 2 of the drawings, as shown therein an electrical wire, generally designated by reference numeral 52, is provided. The function of the wire 52 is to provide the electrical connection between signaling lights 40 and the taillight assembly 42 situated at the rear of the motorcyle 10 and the electrical equipment housed below the fairing 38 at the forward end of the latter. It is, of course, to be understood that the electrical wire 52 is sufficiently resilient so as to be capable of flexing as the vehicular seat and fairing assembly 34 moves between the position thereof depicted in FIG. 1 of the drawings and that shown in FIG. 2 thereof.

Figure 2:
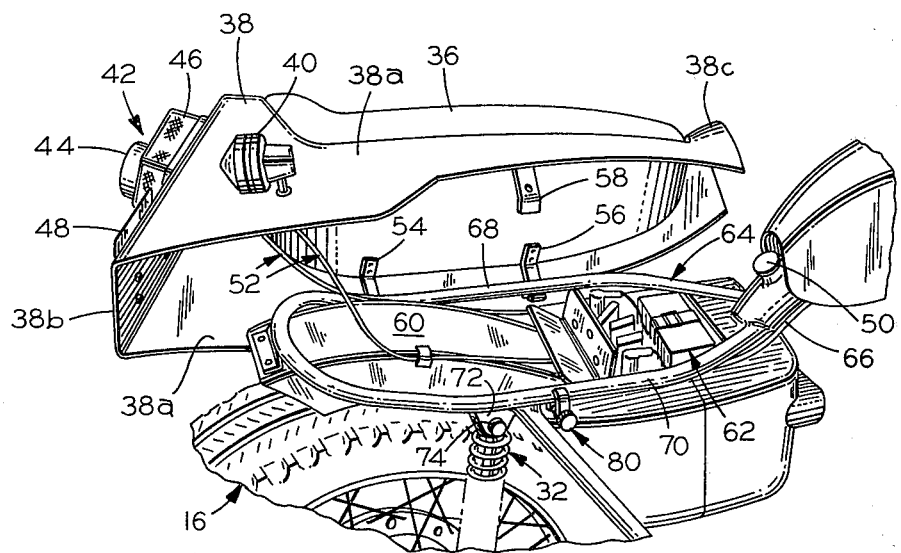
FIG. 2 is a perspective view of a portion of a motorcycle embodying a vehicular seat and fairing assembly constructed in a accordance with the present invention illustrating the assembly in the unlocked raised position thereof.

Continuing with reference to FIG. 2 of the drawings, the vehicular seat and fairing assembly 34 is mounted on the frame 12 of the motorcycle 10 so as to be capable of movement relative thereto. More particularly, the assembly 34 is supported on a portion of the frame 12 of the motorcycle 10 so as to be movable between a locked lowered position as shown in FIG. 1 of the drawings which comprises the normal position thereof, i.e., the position which the vehicular seat and fairing assembly 34 occupies when the motorcycle 10 is being operated, and an unlocked raised position as depicted in FIG. 2 of the drawings which is the position in which the assembly 34 is placed when it is desired to have ready access to the battery and other electrical equipment commonly housed below a motorcycle seat, for purposes of performing ordinary maintenance and/or repair thereon. The manner in which the vehicular seat and fairing assembly 34 is supported on the frame 12 of the motorcycle 10 so as to permit the aforedescribed pivotal movement to be accomplished will be described subsequently hereinafter. At this point, it will suffice to merely note that adjacent one side wall 38a of the fairing 38 a pair of members 54 and 56 are attached to the under surface of the top wall of the fairing 38 in spaced relation relative to each other and so as to depend therefrom. Another member 58 is attached also to the under surface of the top wall of the fairing 38 adjacent the other side wall 38a thereof so as to be located in opposed relation to the members 54 and 56 and so as to depend from the under surface of the fairing 38. Also, it will be noted from FIG. 2 of the drawings that a stop 50 is provided on the frame 12 of the motorcycle 10 suitably located thereon so as to be engageable with the under surface of the hump 38c of the fairing 38 when the vehicular seat and fairing assembly 34 is in its locked lowered position. More particularly, the stop 50 is operable to limit the extent of downward movement of the vehicular seat and fairing assembly 34 relative to the frame 12 of the motorcycle 10 and also serves as a support for the forward portion of the fairing 38.

Turning again to a consideration of FIG. 2 of the drawings, as seen therein a fender 60 is provided for the rear wheel 16. The fender 60 may be attached to the frame 12 of the motorcycle 10 through the use of any suitable means capable of providing a secure connection between the fender 60 and the frame 12 without obstructing the rotation of the rear wheel 16. Spaced from the fender 60 in a direction toward the front of the motorcycle 10 there is supported the battery 62 and other pieces of electrical equipment to which reference has been had previously hereinabove. The battery 62 and the aforereferenced other pieces of electrical equipment are located so that when the vehicular seat and fairing assembly 34 is in its lowered position, i.e., the position thereof depicted in FIG. 1 of the drawings, the seat and fairing assembly 34 functions as a partial enclosure therefor.

For purposes of mounting the vehicular seat and fairing assembly 34 on the frame 12, the latter is provided with a substantially oval portion, which has been generally designated in FIG. 2 of the drawings by reference numeral 64. As best understood with reference to FIGS. 2 and 3 of the drawings, the portion 64 includes a yoke 66 which is provided at one end thereof and through the operation of which the portion 64 is integrally connected with the frame 12 of motorcycle 10. In addition, the portion 64 includes a pair of leg portions 68 and 70 which are connected at one end to the yoke 64 and which diverge outwardly therefrom and terminate in a circular loop adjacent the rear end of the motorcycle 10. Spaced inwardly of the aforereferenced circular loop which serves to interconnect the ends of the leg portions 68 and 70 opposite the other ends thereof which are connected to the yoke 66, each of the leg portions 68 and 70, respectively, is provided with a gusset 72. The gussets 72 are each provided with a hole (not shown) formed therethrough in which a fastener 74 is received. The latter fasteners 74 function to connect to the gussets 72 one end, i.e., the upper end, of the suspension means 32.

Referring now to FIG. 2 of the drawings, as illustrated therein the leg portion 68 of the portion 64 of the frame 12 is provided with a pair of hinge assemblies generally designated by the reference numerals 76 and 78, respectively. The latter assemblies 76 and 78 are suitably secured on the leg portion 68 such as by being welded thereto so as to be located in spaced relation relative to each other and substantially equally distant from the opposite ends of the leg portion 68. On the other leg portion, i.e., leg portion 70, there is secured a latching means 80. The latter latching means 80 may be secured to the leg portion 70 so as to be rigid therewith through the use of any conventional form of securing means such as for example, by being welded thereto. Moreover, as noted with reference to FIG. 3 of the drawings, the latching means 80 is located on the leg portion 70 so as to be opposite and between the hinge assemblies 76 and 78.

Turning now to a more detailed description of the hinge assemblies 76 and 78, and the latching means 80, reference will be had for this purpose to FIGS. 3-7 of the drawings. Both of the hinge assemblies 76 and 78 embody substantially the same construction. More particularly, the hinge assembly 76 consists of a link 82 which is secured at one end to the leg portion 68 and which is provided at the other end thereof with a pin 84 which extends outwardly therefrom so as to be substantially parallel with the major axis of the leg portion 68. In similar fashion, the hinge assembly 78 consists of a link 86 which is secured at one end to the leg portion 68 and which is provided at the other end thereof with a pin 88 which extends outwardly therefrom so as to be also substantially parallel with the major axis of the leg portion 68. Essentially, the only difference between the construction of the hinge assembly 76 and the hinge assembly 78 resides in the fact that in the hinge assembly 76 the pin 84 extends outwardly from the left side of the link 82 as viewed with reference to FIG. 3 of the drawings, while in the hinge assembly 78 the pin 88 extends outwardly from the right side of the link 86 as viewed with reference to the same figure. Insofar as concerns the latching means 80, the latter includes a pair of members 90 and 92 which are suitably attached to opposite sides of the leg portion 70. Any conventional method of rigidly affixing two members together may be employed for securing the members 90 and 92 to the leg portion 70 such as welding, etc. Adjacent their free ends, each of the members 90 and 92 has formed therethrough an opening 90a and 92a, respectively. The latter openings 90a and 92a are each suitably dimensioned so as to be capable of receiving therewithin with a sliding fit a latching pin 94. The latching pin 94 is supported within the openings 90a and 92a so as to be movable between a latching, i.e., locking, position which is depicted in solid lines in FIG. 7, and a release position which is shown in broken lines in the same figure. The latching pin 94 is retained in mounted position within the openings 90a and 92a through the use of a coil spring 96 and a washer 112. More specifically, as illustrated in FIG. 7 of the drawings, the coil spring 96 envelopes the shaft portion of the latching pin 94 and is held captured between the inner side wall of the member 90 and the inner surface of the washer 112. The assembly of the latching pin 94, the coil spring 96 and the washer 112 is accomplished by first inserting the tip 94a of the latching pin 94 through the opening 90a, then through the center of the coil spring 96, next through the opening provided therefor in the center of the washer 112 and finally through the opening 92a in the member 92. As best understood with reference to FIGS. 4 and 6 of the drawings, the tip 94a in a manner to be referred to more fully subsequently, is designed to be received in a suitably dimensioned opening 98 provided for this purpose in the member 58 whereby when the tip 94a of the latching pin 94 is positioned within the opening 98 the cooperative engagement therebetween is operative to hold the vehicular seat and fairing assembly 34 in locked position relative to the portion 64 of the frame 12 of the motorcycle 10.

In accord with the illustrated embodiment of the invention, the members 54, 56 and 58 which were described previously hereinabove as illustrated in FIG. 4 of the drawings are preferably secured to the under surface of the top wall of the fairing 38 through the use of commonly employed fastening means. More particularly, the member 58 is mounted on the fairing 38 by means of a first pair of threaded studs 100 which are suitably located on the fairing 38 and are received in openings provided therefor in the member 58. The member 58 is retained on the studs 100 through the use of nuts 102 which are threadedly engaged on the studs 100 in tightened relation with respect thereto. In similar fashion, the members 54 and 56 are fastened on the fairing 38 by means of a plurality of studs 108 and nuts 110, the latter being threadedly engaged on the studs 108.

Turning now to a description of the method by which the vehicular seat and fairing assembly 34 is assembled on the frame 12 of the motorcycle 10 as well as the manner in which it is intended to function thereon, reference will be had for this purpose particularly to FIGS. 3 and 4 of the drawings. Referring thereto, it is a relatively simple task to assemble the vehicular seat and fairing assembly 34 on the portion 64 of the motorcycle frame 12. Namely, all that is required is to slide the portion 104 of the member 54 over the pivot pin 84 so that the latter is received in the opening 106 provided in the former. Similarly, although not clearly visible in the drawings, the member 56 is likewise provided with a portion 104 at its free end having an opening 106 provided therein for receiving the pivot pin 88. Preferably, the lateral spacing between the pivot pins 84 and 88 is made such that it is slightly greater than the spacing between the portions 104 and the ends of the members 54 and 56 whereby the latter must be biased slightly outwardly in order to enable the pivot pins 84 and 88 to be received within the openings 106. Also, it will be noted in this connection that the pivot pins 84 and 88 extend in opposite directions relative to the links 82 and 86. Consequently, once the members 54 and 56 are mounted on the pivot pins 84 and 88, by virtue of the fact that the former had to be biased slightly outwardly to accomplish the aforereferenced mounting, a biasing force continues to be exerted tending to bias the members 54 and 56 and more particularly the portions 104 thereof inwardly into engagement with the links 82 and 86. In order to disassemble the vehicular seat and fairing assembly 34 from the motorcycle frame 12 the aforedescribed procedure need merely be reversed. Namely, one of the members 54 or 56 is biased outwardly to permit the corresponding pivot pin 84 or 88 to slide free from the opening 106. Once this has been done, the other pivot pin 84 or 88 is easily removed from the other opening 106 merely by sliding the vehicular seat and fairing assembly 34 relative to the leg portion 68 in a direction away from the free end of the particular pivot pin which it is desired to dislodge. With the vehicular seat and fairing assembly 34 mounted on the motorcycle frame 12, the former is capable of being pivoted about the pivot pins 84 and 88 between a lowered position relative to the frame 12 as shown in FIG. 1 of the drawings and a raised position relative thereto as depicted in FIG. 2 of the drawings. When the vehicular seat and fairing assembly 34 is in its lowered position, it is preferable that the assembly 34 be maintained locked in that position. To accomplish this locking function, as the vehicular seat and fairing assembly 34 is being moved from its raised to its lowered position, the latching pin 94 is moved outwardly relative to the members 90 and 92 essentially to the position depicted in broken lines in FIG. 7 of the drawings so that the tip 94a of the latching pin 94 is essentially flush with the outer wall of the member 92. Then, when the vehicular seat and fairing assembly 34 has reached its lowered position, the latching pin 94 is released so that the tip 94a thereof is free to move into the opening 98 provided therefor in the member 58. This serves to lock the assembly 34 relative to the frame 12. To release the vehicular seat and fairing assembly 34, the latching pin 94 need once again merely be withdrawn to a sufficient extent to permit the tip 94a thereof to be clear of the opening 98. Thereafter, the assembly 34 is free to be moved to its raised position relative to the motorcycle frame 12 so that access may be had to the battery 62 and other electrical equipment housed therebelow.

Although only one embodiment of a vehicular seat and fairing assembly constructed in accordance with the present invention has been shown in the drawings and described hereinabove, it is to be understood that modifications in the construction thereof may be made thereto by those skilled in the art without departing from the essence of the invention. In this connection, some of the modifications which can be made in the vehicular seat and fairing assembly 34 have been alluded to hereinabove, while others will become readily apparent to those skilled in the art when exposed to the present description and illustration of the assembly 34. For example, as noted above the construction of the seat 36 may differ from that previously described without departing from the essence of the invention. In this regard, it is only essential that the size and configuration of the seat 36 be such to permit the latter to be accommodated on the top wall of the fairing 38. In addition, although there has been described herein a specific method of mounting the vehicular seat and fairing assembly 34 to the portion 64 of the frame 12, it is to be understood that other means capable of providing the desired pivotal movement could equally well be employed without departing from the essence of the invention. Also, another structural arrangement could be utilized for purposes of locking the vehicular seat and fairing assembly 34 in its lowered position relative to the motorcycle frame 12 without departing from the essence of the invention. Finally, the accessories for which the vehicular seat and fairing assembly 34 provides a support may be mounted thereon in a different manner from that illustrated in the drawings without departing from the essence of the invention.

Thus, it can be seen that the present invention provides a novel and improved vehicular seat and fairing assembly which is particularly suited to be embodied in a two-wheeled vehicle such as a motorcycle. Moreover, the vehicular seat and fairing assembly of the present invention embodies a construction wherein the seat included therein is constructed so as to meet all of the functional requirements which it is desirable be possessed by a seat designed to be embodied in a motorcycle such as by being weather resistant, providing comfortable seating support for the driver, being compatible for use in different types of motorcycles, etc. Furthermore, in accord with the present invention a vehicular seat and fairing assembly is pivotably mounted to the frame of the motorcycle so as to be movable between a lowered position wherein the assembly cooperates to form an enclosure for the battery and other electrical equipment of the motorcycle and a raised position whereby access may be readily had to the battery and aforementioned equipment for purposes of performing normal maintenance and repair thereon. The vehicular seat and fairing assembly of the present invention when embodied in a motorcycle functions to provide the rear portion of the motorcycle with an attractive appearance and which also is operable to reduce the amount of drag produced by the rear portion of the motorcycle. In addition, there has been provided a vehicular seat and fairing assembly which serves as a support for the license plate and taillight assembly of the present invention. Finally, the vehicular seat and fairing assembly is relatively inexpensive to manufacture, is easily assembled on a motorcycle without necessitating substantial modification thereof, and is capable of being employed on different types of motorcycles.

Having thus described the invention, I claim:

1. A two-wheeled vehicle such as a motorcycle comprising:
   a. a frame;
   b. a pair of wheels supported on said frame for rotation relative thereto;
   c. motor means supported on said frame operatively connected to at least one of said pair of wheels for imparting drive thereto and thereby to the vehicle;
   d. electrical power supply means supported on said frame;
   e. a fairing movable between a first position and a second position relative to said frame, said fairing including a top surface, a pair of side surfaces depending from said top surface, each of said pair of side surfaces having an edge thereof attached to an edge of said top surface, a rear surface depending from said top surface, said rear surface having an edge thereof attached to another edge of said top surface and another pair of edges thereof attached each to another edge of a corresponding one of said pair of side surfaces, said top surface, said pair of side surfaces and said rear surface cooperating together to provide therebetween an enclosure capable of receiving therewithin at least a portion of one of said pair of wheels;
   f. a seat operable as a support for the driver of the vehicle, said seat being rigidly mounted on said top surface of said fairing for movement therewith;
   g. a license plate assembly supported on said rear surface of said fairing for movement therewith;
   h. a taillight assembly supported on said rear surface of said fairing for movement therewith in spaced relation to said license plate assembly;
   i. electrical conductor means having one end thereof connected in circuit relation with said taillight assembly and the other end thereof connected in circuit relation with said electrical power supply means, said electrical conductor means being operable to permit electrical current to be drawn from said electrical power supply means and transmitted therethrough to said taillight assembly for powering said taillight assembly electrically, said electrical conductor means being flexible so as to permit relative movement to occur between said taillight assembly and said electrical power supply means;
   j. hinge means pivotably mounting said fairing to said frame of the vehicle for movement between said first position thereof relative to said frame wherein said fairing is located so as to position said seat mounted thereon for use by the driver of the vehicle and with said portion of said one of said pair of wheels received within said enclosure formed by said top surface, said pair of side surfaces and said rear surface of said fairing and a second position thereof relative to said frame wherein said fairing is located so as to expose and render accessible said portion of said one of said pair of wheels and the other operating components housed below the fairing, said hinge means including a pair of hinge assemblies supported in spaced relation on said frame of the vehicle, each of said pair of hinge assemblies comprising a link having one end attached to said frame of the vehicle and a pivot pin extending outwardly from one side of said link adjacent the free end of said link substantially at right angles to the major axis of said link, said pivot pin of one of said pair of hinge assemblies extending outwardly of said link thereof in a first direction and said pivot pin of the other of said pair of hinge assemblies extending outwardly of said link thereof in the opposite direction, said hinge means further including a pair of members supported from the inside of said top surface of said fairing in spaced relation relative to each other, each of said pair of members including means provided at the free end thereof cooperable with said pivot pin of one of said pair of hinge assemblies to establish a pivotal connection therebetween; and k. latching means cooperatively associated with said fairing and said frame of the vehicle operable for locking said fairing to said frame when said fairing is in the first position thereof, said latching means including a pair of members supported in spaced relation on said frame of the vehicle, each of said pair of members having an opening formed therethrough adjacent the free end thereof located so as to be aligned relative to each other, a spring biased latching pin positioned in said openings in said pair of members for movement between a locking position and a release position relative thereto, a washer received on said spring biased latching pin, a coil spring enveloping said latching pin having one end bearing against said washer and the other end against one of said pair of members operable for biasing said latching pin to the locking position thereof, and a member having one end thereof attached to the inside of said top surface of said fairing and having an opening formed therethrough adjacent the free end thereof operable for receiving the tip of said latching pin therewithin to lock said fairing relative to said frame of the vehicle.

2. The two-wheeled vehicle as set forth in claim 1 further comprising a pair of signaling lights supported on said pair of side surfaces of said fairing for movement therewith and so as to project outwardly therefrom thereby to be visible from the rear of the vehicle, and wherein said electrical conductor means also connects said pair of signaling lights in electrical circuit relation with said electrical power supply means so as to permit electrical current to be drawn from said electrical power supply means and transmitted therethrough to said pair of signaling lights for powering said pair of signaling lights electrically and so as to permit relative movement to occur between said pair of signaling lights and said electrical power supply means.

3. The two-wheeled vehicle as set forth in claim 2 wherein said top surface, said pair of side surfaces and said rear surface of said fairing are all formed integrally with each other.

* * * * *